United States Patent Office 3,453,136
Patented July 1, 1969

---

3,453,136
PRIMER FOR ROOM TEMPERATURE VULCANIZING POLYURETHANES
Harold R. Bylsma, Midland, Mich., assignor to Dow Corning Corporation, Midland, Mich., a corporation of Michigan
No Drawing. Filed Jan. 5, 1967, Ser. No. 607,382
Int. Cl. B44d *1/14;* C03c *17/28*
U.S. Cl. 117—72
6 Claims

ABSTRACT OF THE DISCLOSURE

A primer for room temperature vulcanizing polyurethanes which is a solvent solution of (1) a copolymer of methyl methacrylate and a silane of the formula $RSiX_3$ wherein R is selected from the group consisting of the $CH_2=CHCOO(CH_2)_3-$ and $$CH_2=C(CH_3)COO(CH_2)_3-$$

radicals and X is a hydrolyzable group, and (2) a silane of the formula $RSiX_3$ wherein R and X are as defined above, said copolymer having been prepared by reacting the methyl methacrylate with the silane at a mol ratio of about 2 to 10 mols of methyl methacrylate per mol of silane.

---

Much time, effort and money is constantly being spent in finding new and better ways for adhering one substance to another, or for promoting their natural adhesion. One means for achieving these ends is the use of primers which by a mechanical and/or chemical phenomenon improve adhesion. Numerous primers have been developed and marketed, some touted as being universal primers while others are for specific applications.

This invention is directed to a primer for room temperature vulcanizing polyurethanes, particularly those used as sealants. More specifically, this invention relates to a primer composition consisting essentially of a solvent solution of (1) a copolymer of methyl methacrylate and a silane of the formula $RSiX_3$ wherein R is selected from the group consisting essentially of the $$CH_2=CHCOO(CH_2)_3-$$

and $CH_2=C(CH_3)COO(CH_2)_3-$ radicals and X is a hydrolyzable group, and (2) a silane of the formula $RSiX_3$ wherein R and X are as defined above, said copolymer having been prepared by reacting the methyl methacrylate with the silane at a mol ratio of about 2 to 10 mols of methyl methacrylate per mol of silane.

This invention also relates to an improvement in a method of adhering room temperature vulcanizing polyurethanes to substrates, the improvement comprising priming the substrate with the above composition prior to the application of the polyurethane.

The silanes used in preparing the copolymer and in admixture therewith are defined by the formula $RSiX_3$. As specified above, R can be either of the acrylate functional radicals $CH_2=CHCOO(CH_2)_3-$ or $$CH_2=C(CH_3)COO(CH_2)_3-$$

The X group in the formula is a hydrolyzable one. Thus X can be, for example, a halogen atom or an alkoxy, acyloxy, cellosolveoxy, aryloxy, oxime or an amine group. Specific examples of X include the chlorine, bromine and fluorine atoms, and the methoxy, ethoxy, isopropoxy, butoxy, acetoxy, propionoxy, phenoxy, amino, $$CH_3OCH_2CH_2O-$$

$CH_3CH_2OCH_2CH_2O-$, $(CH_3)_2C=NO-$ and $$(C_2H_5)(CH_3)C=NO-$$

groups. It is preferred that X be an alkoxy group. These silanes are well known compounds and are described numerous places in the literature.

The compositions of this invention are prepared by reacting the methyl methacrylate with the silane at a mol ratio of about 2 to 10 mols of methyl methacrylate per mol of the silane. When the mol ratios go appreciably outside of these limits the compositions have either been found to be ineffective as primers for room temperature vulcanizable polyurethanes, or they have shown no added benefits to be obtained. The reaction of the methyl methacrylate and the silane is best carried out by heating a mixture of the two materials in any suitable solvent and in the presence of a free radical catalyst. There are no known critical limitations with respect to the reaction conditions such as time, temperature, solvent and catalyst used. Reaction conditions will generally be those normally used in the polymerization of acrylates and other unsaturated compounds, the time, temperature and solvent employed being determined by the specific catalyst selected and its activation temperature and stability. These factors are well known to those skilled in the art and hence will not be discussed further here. Generally speaking, best results have been obtained by heating at 70° to 100° C. for 2 to 5 hours employing Cellosolve acetate as the solvent and azobisisobutyronitrile as the catalyst. After the preparation of the composition is complete its concentration in the solvents can be adjusted to the desired level by further addition of any suitable solvent.

It should be noted that neither the copolymer nor the silane alone is effective as a primer for room temperature vulcanizable polyurethanes. It will be obvious, of course, to those skilled in the art that various minor modifications can be made in the above description of the invention which do not depart from the spirit or scope thereof. For example, a small amount of another acrylate such as hydroxypropyl methacrylate can be incorporated into the copolymer, or a mercaptan chain transfer agent such as mercaptopropyltrimethoxysilane can be used in the preparation of the compositions. However, such modifications contribute negligibly, if at all, to the basic composition and its properties. Other acrylates such as ethyl acrylate or 2-ethylhexylacrylate, cannot, however, be substituted in total for the methyl methacrylate.

Now in order that those skilled in the art may better understand how the instant invention can best be practiced, the following the examples are given by way of illustration and not by way of limitation.

In the examples the primers were evaluated using the peel adhesion test as described in section 4.8.10 of military specification MIL-S-8802C (Apr. 19, 1961) using aluminum screen and various substrates, and with the exceptions that the room temperature vulcanizable polyurethane was allowed to cure for seven days. One 1" test strip was pulled immediately after the cure was complete, and the second 1" test strip was pulled immediately after a 48 hour immersion in water at room temperature. These test results are reported as the "dry" and "wet" results respectively. The adhesion is reported in pounds per inch with a plus (+) indicating that the actual adhesion was greater than the specified value but the test stopped at that point. The failure is reported as the percent that was cohesive failure.

Example 1

To a reaction vessel, equipped with a stirrer, thermometer and reflux condenser, there was added 37 g. of methyl methacrylate, 10 g. of $$CH_2=C(CH_3)COO(CH_2)_3Si(OCH_3)_3$$

108 g. of cellosolve acetate and 0.5 g. of azobisisobutyronitrile. The mixture was heated for 90 minutes at 95° C., then 0.25 g. of azobisisobutyronitrile added, and then heating continued for another 90 minutes at 95° C. The resulting composition was a solvent solution of a copolymer of the methyl methacrylate and the silane and some unreacted silane. Upon cooling to room temperature, the solution was diluted by adding 790 g. of xylene. Part of the resulting composition was evaluated, as prepared, as a primer. To another part of the composition there was added 1% by weight of the silane and then this was evaluated as a primer. A control evaluation with no primer being used was also made. The results are set forth in the table below.

Example 3

To a reaction vessel, equipped as in Example 1, there was added 72 g. of methyl methacrylate, 78 g. of $$CH_2=C(CH_3)COO(CH_2)_3Si(OCH_3)_3$$

150 g. of Cellosolve acetate and 1 g. of aziobisisobutyronitrile. The mixture was heated at 75° to 80° C. for four hours. Upon cooling to room temperature the resulting composition was diluted with 2700 g. of xylene. The composition was evaluated as a primer and the results are set forth in the table below.

|  | Composition as prepared | | | |
|---|---|---|---|---|
|  | Dry | | Wet | |
| Substrate | Adhesion | Failure | Adhesion | Failure |
| Glass | 97 | SB | 45 | 0 |
| Aluminum | 112 | SB | 75 | SB |
| Stainless steel | 108 | SB | 72 | SB |
| Mild steel | 107 | SB | 90 | SB |
| Concrete | 79 | SB | 92 | SB |
| Marble | 72 | SB | 0 | 0 |

Example 4

Six primers were prepared for evaluating using the process of Example 1. The reactants used in the compositions were as follows:

(A) 37 g. of methyl methacrylate, 5.5 g. of hydroxylpropyl methacrylate, 10 g. of $$CH_2=C(CH_3)COO(CH_2)_3Si(OCH_3)_3$$

|  |  |  | Substrate | | | | | |
|---|---|---|---|---|---|---|---|---|
|  |  |  | Glass | Aluminum | Stainless steel | Mild steel | Concrete | Marble |
| Control, no primer | Dry | Adhesion | 20 | 6 | 4 |  | 13 | 8 |
|  |  | Failure | 0 | 0 | 0 |  | 0 | 0 |
|  | Wet | Adhesion | 0 | 4 | 0 |  | 6 | 4 |
|  |  | Failure | 0 | 0 | 0 |  | 0 | 0 |
| Composition as prepared | Dry | Adhesion | 90 | 65 | 90+ | 80 | 64 | 23 |
|  |  | Failure | 100 | 0 | 100 | 0 | 10 | 0 |
|  | Wet | Adhesion | 6 | 22 | 34 | 2 | 74 | 6 |
|  |  | Failure | 0 | 0 | 0 | 0 | 5 | 0 |
| Composition plus 1% silane | Dry | Adhesion | 60+ | 60+ | 60+ | 60+ | 70+ | 21 |
|  |  | Failure | 100 | 90 | 100 | 100 | 80 | 0 |
|  | Wet | Adhesion | 4 | 60+ | 60+ | 60+ | 50 | 7 |
|  |  | Failure | 0 | 20 | 100 | 10 | 10 | 0 |

Example 2

A primer was prepared by the same process set forth in Example 1 except that the initial charge to the reaction vessel consisted of 111 g. of methyl methacrylate, 120 g. of $CH_2=C(CH_3)COO(CH_2)_3Si(OCH_3)_3$, 324 g. of cellosolve acetate and 1.5 g. of azobisisobutyronitrile. The second addition of catalyst was 0.75 g. and 306 g. of xylene was used to dilute the resulting product. Part of the resulting composition was evaluated, as prepared, as a primer. To another part of the composition there was added 1% by weight of the silane and then this was evaluated as a primer. The results are set forth in the table below.

108 g. of Cellosolve acetate, 0.75 g. of azobisisobutyronitrile and 790 g. of xylene.

(B) Composition A to which another 1% by weight of the silane was added after preparation.

(C) Same as A except that 20 g. of the silane were used.

(D) Composition C to which another 1% by weight of the silane was added after preparation.

(E) Same as A except that 40 g. of the silane were used.

(F) Composition E to which another 1% by weight of silane was added after preparation.

|  |  |  | Substrate | | | | | |
|---|---|---|---|---|---|---|---|---|
|  |  |  | Glass | Aluminum | Stainless steel | Mild steel | Concrete | Marble |
| Composition as prepared | Dry | Adhesion | 75 | 80 | 97 | 98 | 92 | 73 |
|  |  | Failure | [1] SB | SB | SB | SB | 100 | 100 |
|  | Wet | Adhesion | 98 | 72 | 73 | 78 | 81 | 34 |
|  |  | Failure | SB | SB | SB | SB | SB | 0 |
| Composition plus 1% silane | Dry | Adhesion | 84 | 106 | 77 | 86 | 60 | 69 |
|  |  | Failure | SB | SB | SB | SB | 100 | 100 |
|  | Wet | Adhesion | 93 | 93 | 83 | 103 | 55 | 99 |
|  |  | Failure | SB | SB | SB | SB | 10 | SB |

[1] SB=Screen broke.

Results of the evaluation of these primers are set forth in the table below.

| | | | Substrate | | | | | |
|---|---|---|---|---|---|---|---|---|
| | | | Glass | Aluminum | Stainless steel | Mild steel | Concrete | Marble |
| A | Dry | Adhesion | 70 | 29 | 83 | 80 | 45 | 30 |
| | | Failure | SB | 0 | SB | SB | 0 | 0 |
| | Wet | Adhesion | 0 | 0 | 0 | 0 | 13 | 0 |
| | | Failure | 0 | 0 | 0 | 0 | 0 | 0 |
| B | Dry | Adhesion | 87 | 65 | 82 | 85 | 54 | 40 |
| | | Failure | SB | 40 | SB | SB | 0 | 0 |
| | Wet | Adhesion | 0 | 42 | 0 | 36 | 19 | 0 |
| | | Failure | 0 | 0 | 0 | 0 | 0 | 0 |
| C | Dry | Adhesion | 65+ | 65+ | 70+ | 65+ | 65+ | 30 |
| | | Failure | 100 | 100 | 100 | 100 | 100 | 0 |
| | Wet | Adhesion | 27 | 40 | 28 | 22 | 45 | 7 |
| | | Failure | 0 | 5 | 5 | 5 | 40 | 0 |
| D | Dry | Adhesion | 65+ | 65+ | 65+ | 65+ | 65+ | 60 |
| | | Failure | 100 | 100 | 100 | 90 | 100 | 5 |
| | Wet | Adhesion | 12 | 40 | 62 | 65+ | 45 | 8 |
| | | Failure | 0 | 50 | 80 | 100 | 20 | 0 |
| E | Dry | Adhesion | 60+ | 60+ | 60+ | 60+ | 60+ | 60+ |
| | | Failure | 100 | 100 | 100 | 100 | 100 | 100 |
| | Wet | Adhesion | 60+ | 60+ | 60+ | 60+ | 56 | 11 |
| | | Failure | 100 | 100 | 100 | 100 | 80 | 0 |
| F | Dry | Adhesion | 60+ | 60+ | 60+ | 60+ | 60+ | 60 |
| | | Failure | 100 | 100 | 100 | 100 | 100 | 5 |
| | Wet | Adhesion | 60+ | 60+ | 60+ | 60+ | 60+ | 7 |
| | | Failure | 100 | 100 | 100 | 100 | 50 | 0 |

Example 5

When the following silanes are substituted for the silane of the previous examples, essentially equivalent results are obtained.

(A) $CH_2=CHCOO(CH_2)_3Si(OCH_3)_3$
(B) $CH_2=CHCOO(CH_2)_3Si(OC_2H_5)_3$
(C) $CH_2=CHCOO(CH_2)_3Si(OC_6H_5)_3$
(D) $CH_2=CHCOO(CH_2)_3Si(OCH_2CH_2OCH_3)_3$
(E) $CH_2=CHCOO(CH_2)_3Si(NH_2)_3$
(F) $CH_2=C(CH_3)COO(CH_2)_3Si(OC_3H_7)_3$
(G) $CH_2=C(CH_3)COO(CH_2)_3SiCl_3$
(H) $CH_2=C(CH_3)COO(CH_2)_3Si(OOCCH_3)_3$
(I) $CH_2=C(CH_3)COO(CH_2)_3Si[ON=C(CH_3)_2]_3$

That which is claimed is:

1. A composition consisting essentially of a solvent solution of (1) a copolymer of methyl methacrylate and a silane of the formula $RSiX_3$ wherein R is selected from the group consisting of the $CH_2=CHCOO(CH_2)_3-$ and $CH_2=C(CH_3)COO(CH_2)_3-$ radicals and X is a hydrolyzable group, and (2) a silane of the formula $RSiX_3$ wherein R and X are as defined above, said copolymer having been prepared by reacting the methyl methacrylate with the silane at a mol ratio of about 2 to 10 mols of methyl methacrylate per mol of silane.

2. A composition as defined in claim 1 wherein the silane is $CH_2=C(CH_3)COO(CH_2)_3Si(OCH_3)_3$.

3. A composition as defined in claim 2 wherein the mol ratio of the methyl methacrylate to silane is about 2 to 1.

4. In a method for adhering a room temperature vulcanizable polyurethane to a substrate, the improvement which comprises priming the substrate with a composition as defined in claim 1.

5. In a method for adhering a room temperature vulcanizable polyurethane to a substrate, the improvement which comprises priming the substrate with a composition as defined in claim 2.

6. In a method for adhering a room temperature vulcanizable polyurethane to a substrate, the improvement which comprises priming the substrate with a composition as defined in claim 3.

References Cited

UNITED STATES PATENTS

| | | |
|---|---|---|
| 2,438,612 | 3/1948 | MacKenzie et al. |
| 2,628,246 | 2/1953 | MacKenzie et al. |
| 2,991,204 | 7/1961 | Astle. |
| 2,992,939 | 7/1961 | Larson et al. _____ 117—75 |
| 3,109,011 | 10/1963 | Pike et al. |
| 3,377,371 | 4/1968 | Quaal. |
| 3,398,210 | 8/1968 | Plueddemann et al. |

WILLIAM D. MARTIN, *Primary Examiner.*

R. HUSACK, *Assistant Examiner.*

U.S. Cl. X.R.

117—75, 123, 124, 132; 260—86.1, 827, 33.6